A. W. COPLEY.
ELECTRICAL RELAY.
APPLICATION FILED JULY 24, 1912.
1,189,240.
Patented July 4, 1916.
2 SHEETS—SHEET 1.
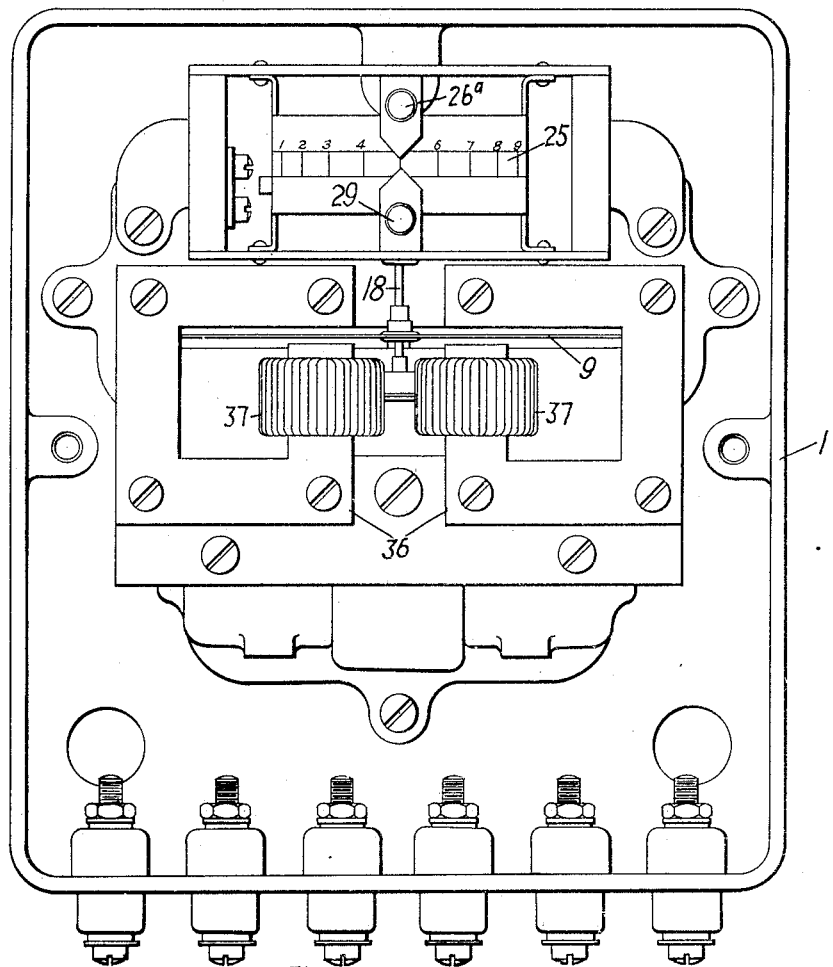
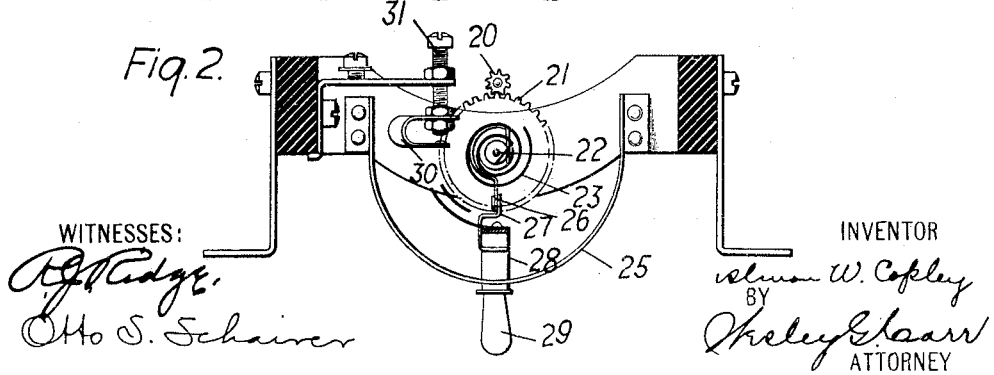

A. W. COPLEY.
ELECTRICAL RELAY.
APPLICATION FILED JULY 24, 1912.

1,189,240.

Patented July 4, 1916.
2 SHEETS—SHEET 2.

UNITED STATES PATENT OFFICE.

ALMON W. COPLEY, OF WILKINSBURG, PENNSYLVANIA, ASSIGNOR TO WESTINGHOUSE ELECTRIC AND MANUFACTURING COMPANY, A CORPORATION OF PENNSYLVANIA.

ELECTRICAL RELAY.

1,189,240.     Specification of Letters Patent.     Patented July 4, 1916.

Application filed July 24, 1912. Serial No. 711,205.

*To all whom it may concern:*

Be it known that I, ALMON W. COPLEY, a citizen of the United States, and a resident of Wilkinsburg, in the county of Allegheny and State of Pennsylvania, have invented a new and useful Improvement in Electrical Relays, of which the following is a specification.

My invention relates to electrical relays, and particularly to such relays as are employed in connection with circuit-breakers and similar apparatus for the purpose of causing their operation upon the occurrence of certain electrical conditions and continuance thereof for predetermined periods of time.

The object of my invention is to provide a relay of the character and for the purpose indicated whereby the period during which an abnormal electrical condition must continue, before the relay will cause operation of the device controlled by it, may be adjusted to be substantially inversely as the value of the excessive electrical condition, or which will permit of securing other desirable relations between the value of the excessive electrical quantity and the period during which it must continue to cause operation of the apparatus controlled thereby.

Figure 3:
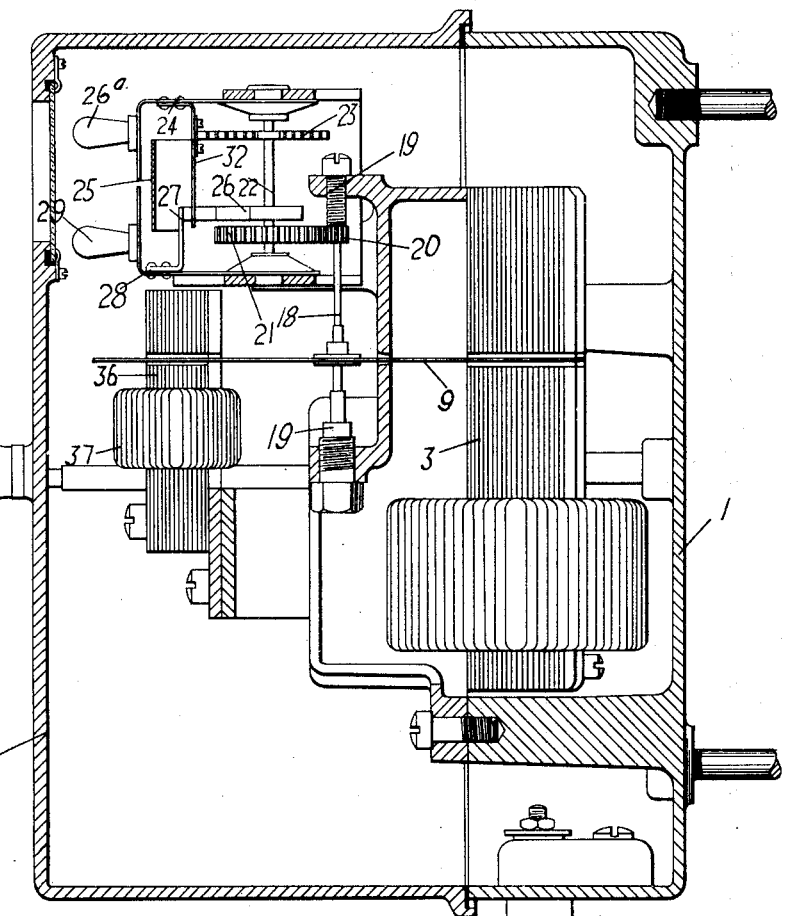
Figure 4:
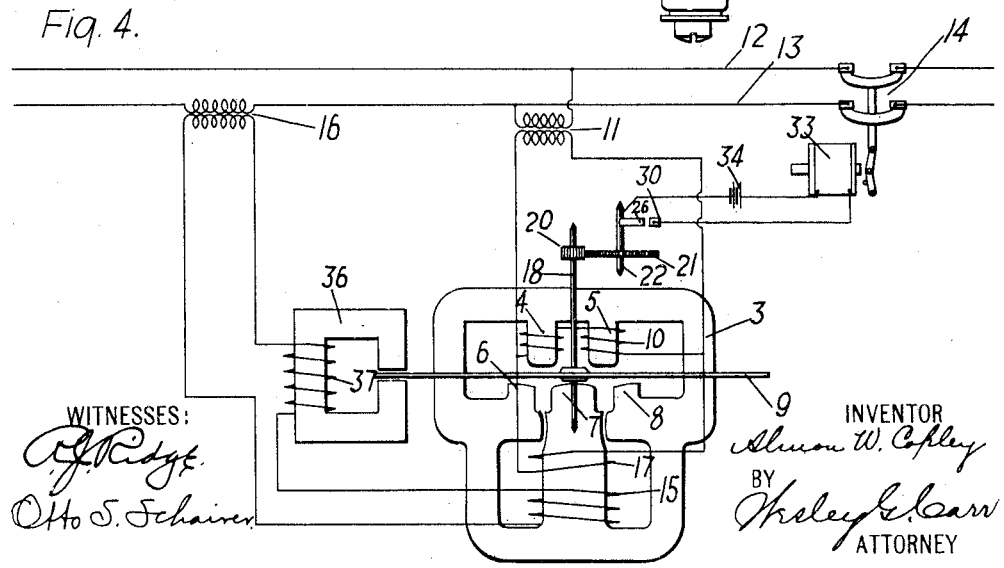

My invention is illustrated in the accompanying drawings, Figure 1 of which is a view, in front elevation, of a device constructed in accordance therewith, the cover of the device being removed to expose the inclosed parts. Fig. 2 is a plan view of some of the parts of the device of Fig. 1. Fig. 3 is a view, in side elevation and in section, of the device of Fig. 1, and Fig. 4 is a diagrammatic view of the connections of the device.

The operating parts of the device are inclosed within a casing, consisting of a back or base member 1 which serves as a support for said parts and a removable cover 2, and they comprise a magnetizable core 3 having two sets of poles 4 and 5 and 6, 7 and 8, respectively, that are disposed upon opposite sides of a conducting disk 9 which constitutes the movable element. The poles 4 and 5 are provided with a winding 10 to receive current, preferably through a transformer 11, that is proportional to the voltage of a distributing circuit 12—13 having a circuit-breaker 14, the operation of which is controlled by the present relay. The poles 6 and 8 are disposed upon opposite sides of the pole 7 and are separated therefrom by suitable air gaps, they being also of opposite magnetic polarity to the pole 7. The pole 7 is surrounded by a coil 15 to receive current that is proportional to the current traversing the circuit conductor 13, preferably through a series transformer 16, and also by a coil 17 that is connected to the terminals of the winding 10.

The structure and arrangement of the core parts and windings have such relation to what is set forth in patent No. 933,746 as to insure a substantially similar mode of operation and an equivalent result, from which it will be understood that two torques are normally exerted upon the movable element 9 which are respectively substantially proportional to the energy and to the square of the current traversing the circuit 12—13. In other words, the element 9 is subjected to opposing wattmeter and ammeter torques, the ammeter torque normally acting also to oppose from its initial position movement of the disk 9.

The movable element 9 is carried by a shaft 18 that is mounted in suitable bearings 19 and is provided at its upper end with a pinion 20 to mesh with a gear 21 that is mounted upon another shaft 22. The inner end of a spiral spring 23 is attached to the shaft 22 and the outer end of the spring is attached to a rotatively mounted arm 24, the front end of which is bent downwardly at right angles to the main portion thereof to provide an index adjacent to the face of a scale 25, the downwardly bent end of the arm being also provided with an operating handle 26ª. The arm 24 is movable through a limited range for the purpose of adjusting the torque to be exerted by the spring 33 upon the shaft 22 and for determining the value of the electromagnetic torque which must be exerted upon the movable element 9 to cause rotation thereof. Thus, the arm 24 provides means for predetermining the current or energy value at which the relay will begin to operate.

Attached to the shaft 22, directly above the gear 21, is a resilient contact-carrying arm 26, the outer end of which is normally maintained in engagement with a stop 27 upon another rotatively mounted arm 28 that is similar to the arm 24 and has its outer end bent upwardly in opposition to the downwardly bent end of the arm 24 and provided with an operating handle 29. The outer end of the arm 26 is adapted to engage a resilient stationary contact terminal 30 that is adjustably mounted upon one end of a screw 31 carried by the frame of the instrument, the engagement of the said parts being effected only when an abnormal electrical condition has existed in the circuit 12—13 for a predetermined length of time. The length of the said period is predetermined by so adjusting the position of the stop 27 as to vary the distance through which the arm 26 must move in order to engage the stationary contact terminal 30, the greater the distance between the said members, the longer the said period. In order that the arm 28 may not be moved in a counter-clockwise direction beyond the position of the arm 24, the latter arm is provided with a stop 32 that extends downwardly into the path of movement of the contact-carrying arm 26. The contact-carrying arm 26 is connected to one terminal of a tripping coil 33 of the circuit-breaker 14, and the stationary contact terminal 30 is connected to the other terminal thereof, a battery 34 or any other suitable source of power being included in the said circuit.

The disk 5 is retarded in its rotation by means of two electromagnets comprising core members 36, the poles of which are disposed upon opposite sides of the disk, and coils 37 that are connected in series with the winding 15, or are otherwise suitably arranged to receive currents that are substantially proportional to the current traversing the circuit 12—13. Since the coils 37 are energized in proportion to the amount of current traversing the circuit to be protected, they exert a greater retarding effect upon the disk 9 at the higher current values than at the lower values, and they consequently modify the characteristics of the instrument. This modification of the characteristics is such as to cause the period during which an abnormal condition must exist in order to cause engagement of the contact terminals 26 and 30 to be more nearly in inverse relation to the value of the overload upon the circuit 12—13 than would be the case if electromagnetic damping means were not provided. In fact, by proper adjustment of the windings and magnetic circuits, a substantially inverse relation of the said quantities may be obtained through a considerable range of operation, or other characteristics differing therefrom may be obtained, as desired. By reason of the provision of a speed-reducing connection between the disk 9 and the contact-carrying arm 26, it is permissible for the disk to rotate at such a speed that the electromagnets will exert a material retarding effect thereon. Accordingly, greater accuracy of adjustment of the period during which the abnormal condition must continue in order to cause the circuit-breaker to open is possible than would be the case if the disk 9 made only a partial revolution in effecting engagement of the members 26 and 30.

The device is adapted to serve as an overload and reverse current relay when connected as shown in Fig. 4, but, if the windings 10 and 17 are not connected to the transformer 11 or to the circuit 12—13, it will serve as an overload relay only.

It will be readily understood that, although the device is particularly useful for the purpose of controlling the operation of a circuit-breaker, it may be employed for other purposes and in other relations, and also that it is not limited in its application to use in connection with a relay of the kind herein set forth, but may be employed generally wherever electromagnetic damping in proportion to the current traversing a circuit may be desirable.

I claim as my invention:

1. A relay for an electric circuit comprising a magnetizable member, a rotatable disk armature therefor, potential and current windings for the magnetizable member and an electromagnet for retarding the armature in accordance with the current that traverses the circuit.

2. The combination with an alternating-current circuit, of a relay comprising a magnetizable member, a conducting armature that is inductively actuated in accordance with the energy traversing the circuit, and means for retarding the armature in accordance with the current that traverses the circuit.

3. A relay for an electric circuit comprising a stationary magnetizable member, a disk armature, potential and current windings surrounding the magnetizable member for actuating the armature in accordance with the energy traversing the circuit, and two retarding electromagnets for the armature supplied with current in accordance with the current traversing the circuit.

4. A relay comprising a magnetizable member, current and potential windings therefor, a rotatable armature actuated by the magnetic lines of force from the magnetizable member, and a laminated magnetizable member having a current winding thereon for retarding the armature.

In testimony whereof I have hereunto subscribed my name this 17th day of July, 1912.

ALMON W. COPLEY.

Witnesses:
CLAYTON DILL,
B. B. HINES.